United States Patent
Park et al.

(10) Patent No.: US 9,660,254 B2
(45) Date of Patent: May 23, 2017

(54) METHOD FOR PRODUCING SILICON-BASED NEGATIVE ELECTRODE ACTIVE MATERIAL, NEGATIVE ELECTRODE ACTIVE MATERIAL FOR LITHIUM SECONDARY BATTERY, AND LITHIUM SECONDARY BATTERY COMPRISING SAME

(75) Inventors: Soojin Park, Ulsan (KR); Sin Ho Choi, Busan (KR); Byoung Man Bang, Gyeongsan-si (KR); Jaephil Cho, Ulsan (KR)

(73) Assignees: UNIST (ULSAN NATIONAL INSTITUTE OF SCIENCE AND TECHNOLOGY), Ulsan (KR); SJ MATERIALS CO., LTD, Ulsan (KR)

( * ) Notice: Subject to any disclaimer, the term of this patent is extended or adjusted under 35 U.S.C. 154(b) by 421 days.

(21) Appl. No.: 14/399,333

(22) PCT Filed: Aug. 31, 2012

(86) PCT No.: PCT/KR2012/006987
§ 371 (c)(1),
(2), (4) Date: Nov. 6, 2014

(87) PCT Pub. No.: WO2013/168853
PCT Pub. Date: Nov. 14, 2013

(65) Prior Publication Data
US 2015/0140426 A1    May 21, 2015

(30) Foreign Application Priority Data

May 8, 2012   (KR) .................. 10-2012-0048713

(51) Int. Cl.
*H01M 4/04*      (2006.01)
*H01M 4/134*     (2010.01)
(Continued)

(52) U.S. Cl.
CPC ....... *H01M 4/0471* (2013.01); *H01M 4/0402* (2013.01); *H01M 4/134* (2013.01);
(Continued)

(58) Field of Classification Search
CPC ..... H01M 4/0471; H01M 4/134; H01M 4/386
(Continued)

(56) References Cited

U.S. PATENT DOCUMENTS

2009/0029256 A1 * 1/2009 Mah .................. H01B 1/24
                                                            429/231.8
2010/0075227 A1   3/2010 Morita et al.
2012/0100438 A1   4/2012 Fasching et al.

FOREIGN PATENT DOCUMENTS

CN  102259858   11/2011
JP  2006-321688  11/2006
(Continued)

OTHER PUBLICATIONS

Bao et al. Chemical reduction of three-dimensional silica micro-assemblies into microporous silicon replicas. Nature, vol. 446, 2007, pp. 172-175 [online], [retrieved on Feb. 21, 2017]. Retrieved from the Internet <URL: http://www.nature.com/nature/journal/v446/n7132/pdf/nature05570.pdf>.*

(Continued)

*Primary Examiner* — Basia Ridley
*Assistant Examiner* — James Erwin
(74) *Attorney, Agent, or Firm* — Lex IP Meister, PLLC

(57) ABSTRACT

The present invention relates to a method for preparing a silicon-based negative electrode active material, a negative electrode active material for a lithium secondary battery, and a lithium secondary battery comprising the same. More particularly, the method for preparing the silicon-based negative electrode active material comprises: preparing a porous silica ($SiO_2$) and a thin metal film; coating the porous (Continued)

silica onto the thin metal film; reducing the porous silica to a porous silicon by performing heat-treatment of the thin metal film and the porous silica; and obtaining the porous silicon.

14 Claims, 8 Drawing Sheets

(51) Int. Cl.
*H01M 4/38* (2006.01)
*H01M 10/052* (2010.01)
*H01M 4/02* (2006.01)

(52) U.S. Cl.
CPC ......... *H01M 4/386* (2013.01); *H01M 10/052* (2013.01); *H01M 2004/021* (2013.01); *H01M 2004/027* (2013.01); *Y02P 70/54* (2015.11)

(58) Field of Classification Search
USPC ...................................................... 429/218.1
See application file for complete search history.

(56) References Cited

FOREIGN PATENT DOCUMENTS

| JP | 2009-032693 | 2/2009 |
|----|----|----|
| JP | 2011-119263 | 6/2011 |
| JP | 2013-545228 | 12/2013 |
| JP | 2014-513385 | 5/2014 |
| JP | 2014-119263 | 6/2014 |
| KR | 10-0493960 | 5/2005 |
| KR | 10-2009-0011888 | 2/2009 |
| KR | 10-2012-0012092 | 2/2012 |
| WO | 2012-005389 | 1/2012 |
| WO | 2012-054766 | 4/2012 |

OTHER PUBLICATIONS

International Search Report of PCT/KR2012/006987 dated Feb. 26, 2013.
Mingyi Guo et al, "Fabrication of high surface area mesoporous silicon via magnesiothermic reduction for drug delivery", Microporous and Mesoporous Materials, Elsevier Science Publishing, New York, US, vol. 142, No. 1, doi:10.1016/J.MICROMESO. 2010.11.036, ISSN 1387-1811, Nov. 29, 2010, p. 194-201, (Dec. 5, 2010), XP028163807 [X] 1 2.3 Reduction of silica to silicon.
The Extended European Search Report, European Patent Office, Application No. 12876512.0, Nov. 30, 2015.
Office Action, Japanese Patent Office, Application No. 2015-511334, Dec. 7, 2015.

\* cited by examiner

METHOD FOR PRODUCING SILICON-BASED NEGATIVE ELECTRODE ACTIVE MATERIAL, NEGATIVE ELECTRODE ACTIVE MATERIAL FOR LITHIUM SECONDARY BATTERY, AND LITHIUM SECONDARY BATTERY COMPRISING SAME

TECHNICAL FIELD

The present invention relates to a method for preparing a silicon-based negative electrode active material, a negative electrode active material for a lithium secondary battery, and a lithium secondary battery comprising the same.

BACKGROUND ART

Lithium secondary batteries are recently in the spotlight as a driving power source for electronic devices. As a negative electrode material for the lithium secondary battery, graphite has been mainly used. However, the graphite has a low capacity per unit mass of 372 mAh/g. Thus, preparation of a high-capacity lithium secondary battery is difficult.

As a negative electrode material exhibiting higher capacity than graphite, there are materials forming an intermetallic compound with lithium, such as silicon, tin, an oxide thereof, and the like.

However, volumes of the above materials are expanded because crystal structures are changed when absorbing and storing lithium. When silicon absorbs and stores the maximum amount of lithium, the silicon is transformed into $Li_4.4Si$ and the volume is expanded by a charging. The rate of increase in volume caused by the charging is expanded up to about 4.12 times than the volume of the silicon before the volume expansion. For reference, the volume expansion ratio of the graphite currently used for the negative electrode material is about 1.2 times.

Therefore, a significant amount of research on a high capacity of the negative electrode active material such as the silicon, that is, a research for decreasing the volume expansion ratio by alloying of silicon has been performed. However, the research is not practical because a metal such as Si, Sn, Al, and the like is alloyed with the lithium during charge and discharge, as a result, the volume expansion and contractions occur. Thus, the metal is micronized and the cycle characteristics of the battery are degraded.

Silicon is known as an element most likely to have the high capacity. However, the amorphization of the silicon by itself alone is difficult. The amorphization of the alloy containing the silicon as a main component is also difficult.

Moreover, the silicon-based negative electrode active material has another problem because whose crystal is highly brittle. Thus, cracks suddenly occur inside the negative electrode active material located in the electrode during repeated intercalation and deintercalation of the lithium, as a result, the life characteristics of the battery are deteriorated immediately.

DISCLOSURE

Technical Problem

The present invention provides a method for preparing a silicon-based negative electrode active material, a negative electrode active material for a lithium secondary battery, and a lithium secondary battery comprising the same. Thus, a lithium secondary battery having improved life characteristics can be prepared.

Technical Solution

According to an embodiment of the present invention, provided is a method for preparing the silicon-based electrode active material, comprising: preparing a porous silica ($SiO_2$) and a thin metal film; coating the porous silica onto the thin metal film; reducing the porous silica to a porous silicon by performing heat-treatment of the thin metal film and the porous silica; and obtaining the porous silicon.

The porous silica may be derived from diatomite.

The coating the porous silica onto the thin metal film may be coating a water-soluble polymer and the porous silica onto the thin metal film.

The water-soluble polymer may be polyethylene oxide, polyvinylpyrrolidone, polyacrylic acid, polyvinyl alcohol, polyethyleneimine, or a combination of thereof.

The coating a water-soluble polymer and the porous silica onto the thin metal films may be coating the water-soluble polymer onto the interface between the thin metal film and the porous silica.

The thin metal film may be a thin aluminum film, a thin magnesium film, a thin calcium film, or a combination of thereof.

A pattern may be formed on a surface of the thin metal film. The pattern may be a stripe shape.

The pattern may be formed at intervals of 1 to 100 μm.

The coating the porous silica onto the thin metal film may be performed by a roll-to-roll method.

In the coating the porous silica onto the thin metal film, there may be a plurality of units when supposing a thin metal film coated with the porous silica is one unit.

In the reducing the porous silica to a porous silicon by performing heat-treatment of the thin metal film and the porous silica, the heat-treatment temperature may be 700 to 950° C. More particularly, the temperature may be 750 to 900° C.

According to another embodiment of the present invention, provided is a negative electrode active material for a lithium secondary battery, comprising the porous silicon obtained according to the preparation method for a lithium secondary battery mentioned above.

According to another embodiment of the present invention, provided is a lithium secondary battery comprising: a negative electrode including the negative electrode active material for the lithium secondary battery; a positive electrode including a positive electrode active material; and an electrolyte.

The lithium secondary battery may further comprise a separator between the positive electrode and the negative electrode.

Advantageous Effects

By using the method for preparing the silicon-based negative electrode active material, according to an embodiment of the present invention, a lithium secondary battery having an improved cycle life characteristics can be provided because the volume expansion of the silicon is reduced during charge and discharge.

MODE FOR INVENTION

Figure 1:
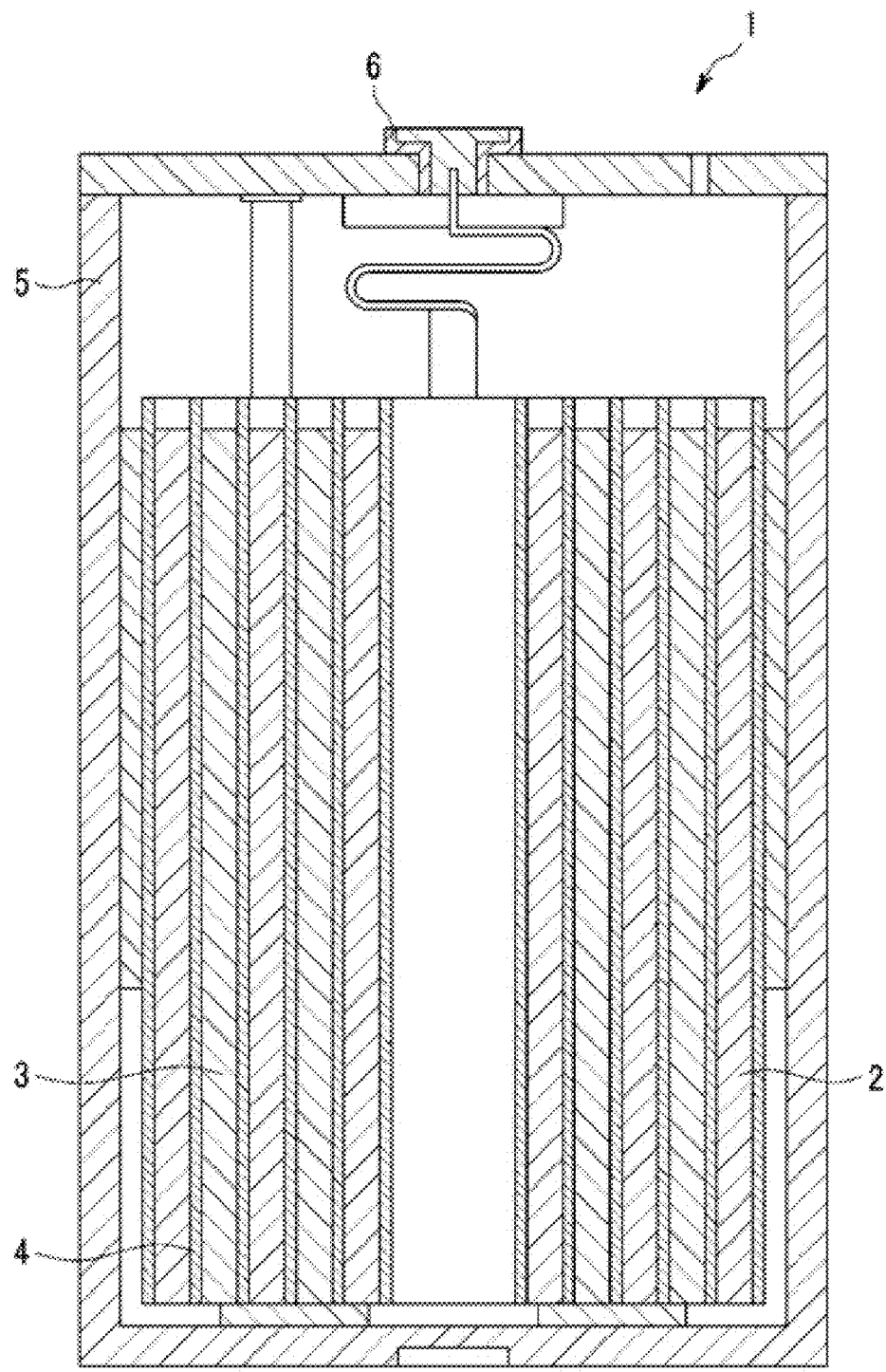
FIG. 1 is a schematic view illustrating a lithium secondary battery according to an embodiment of the present invention.

Hereinafter, embodiments of the present invention will be described in detail. However, it is for illustrative purpose only and not meant to limit or otherwise narrow the scope of the present invention. Therefore, the present invention will only be defined by the appended claims.

The lithium secondary battery may be classified into a lithium ion battery (hereinafter referred to as "lithium secondary battery"), a lithium ion polymer battery, and a lithium polymer battery depending on the sort of the electrolyte and the separator used therein, and it may have a cylindrical shape, a square shape, a coin shape, a pouch shape, or the like depending on its shape, and it may be a bulk type or a thin film type depending on its size. Since the structure of the battery and the method for preparing the same are well known in the art, the detailed description thereof will be omitted.

Generally, a lithium secondary battery is configured by sequentially stacking the negative electrode, the positive electrode, and the separator, and storing them in the battery container as a spiral wound shape.

The negative electrode includes a current collector and a negative electrode active material layer formed on the current collector, and the negative electrode active material layer includes a negative electrode active material.

The negative electrode active material includes materials capable of reversibly intercalating and deintercalating lithium ions, a lithium metal, lithium metal alloys, materials being capable of doping and dedoping lithium, and transition metal oxides.

A carbon material is one of the materials capable of reversibly intercalating and deintercalating lithium ions. Everything can be used as a carbon-based negative electrode active material normally used in the lithium ion battery. For typical example, one or both of crystalline carbon and amorphous carbon can be used. Example of the crystalline carbon is amorphous, plate, flake, spherical, or fiber shaped natural graphite or artificial graphite. Example of the amorphous carbon is soft carbon (low temperature fired carbon), hard carbon, mesophase pitch carbide, fired coke, or the like.

The alloys prepared by mixing lithium and a metal selected from the group consisting of Na, K, Rb, Cs, Fr, Be, Mg, Ca, Sr, Si, Sb, Pb, In, Zn, Ba, Ra, Ge, Al, and Sn can be used for the lithium metal alloys.

The materials being capable of doping and dedoping lithium are Si, $SiO_x$ ($0<x<2$), Si-Q alloys (wherein Q is an element selected from the group consisting of alkali metals, alkaline earth metals, group 13 elements, group 14 elements, transition metals, rare earth elements, or combinations thereof, except for Si), Sn, $SnO_2$, Sn—R (wherein R is an element selected from the group consisting of alkali metals, alkaline earth metals, group 13 elements, group 14 elements, transition metals, rare earth elements, or combinations thereof, except for Sn), and the like. Moreover, a mixture between at least one of them and $SiO_2$ also can be used as the materials being capable of doping and dedoping lithium. The Q element or the R element is selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof. Moreover, a mixture between at least one of them and $SiO_2$ also can be used as the Q element or the R element.

The transition metal oxides are vanadium oxide, lithium vanadium oxide, and the like.

In addition, a carbon material prepared by carbonizing and graphitizing mesophase spherical particles or a graphite fiber prepared carbonizing step and graphitizing step mesophase pitch fibers is desirable for the crystalline carbon.

In an embodiment of the present invention, provided is a method for preparing a silicon-based negative electrode active material among the negative electrode active materials.

More particularly, provided is the method for preparing the silicon-based negative electrode active material, comprising: preparing a porous silica ($SiO_2$) and a thin metal film; coating the porous silica onto the thin metal film; reducing the porous silica to a porous silicon by performing heat-treatment of the thin metal film and the porous silica; and obtaining the porous silicon.

Mixtures between the silicon-based negative electrode active material prepared by the method for preparing the negative electrode active material according to the an embodiment of the present invention and the different negative electrode active material mentioned above can be used as a negative electrode for the lithium secondary battery.

As mentioned above, the structure of the silicon-based negative electrode active material can be easily broken down due to the volume expansion during charge and discharge.

The silicon-based negative electrode active material prepared by the preparing method according to an embodiment of the present invention can reduce the volume expansion of the silicon during charge and discharge. From this, the cycle characteristics of the battery can be improved.

Moreover, in the preparing method according to an embodiment of the present invention, the silicon-based negative electrode active material can be prepared through a simple process with high yield in comparison with the conventional top-down silicon surface etching process or bottom-up silicon growth process.

In addition, the silicon-based negative electrode active material according to an embodiment of the present invention has advantage with respect to porosity control and uniformity as compared to the conventional process.

More particularly, in the preparing method, porous silicon can be prepared by the oxidation-reduction reaction of the thin metal film and the porous silica.

For example, the reduction reaction of the silica is shown in Scheme 1 below. A thin aluminum film is used as the example of the metal film.

$$3SiO_2 + 4Al \rightarrow 2Al_2O_3 + 3Si \qquad [\text{Scheme 1}]$$

The porous silicon can be obtained by the oxidation reaction, whereby silica is reduced to silicon and aluminum is oxidized to aluminum oxide at the same time.

In the reaction product obtained by the reaction, the porous silicon and the aluminum oxide are mixed therein. The aluminum oxide can be removed by a selective etching of the aluminum oxide as a method for separating out the aluminum oxide from the mixture.

The aluminum oxide can be removed by several ways. The first way is stirring the 5 to 11.6 M of hydrochloric acid (HCl) at 25 to 130° C.

The second way is stirring the 3.57 to 7.14 M of phosphoric acid ($H_3PO_4$) at 25 to 130° C.

The third way is stirring the 1.73 to 5.75 M of hydrogen fluoride (HF) at 25 to 50° C.

The fourth way is stirring a mixture between 7.53 M of ammonium hydroxide ($NH_4OH$) and 9.79 M of hydrogen peroxide ($H_2O_2$) at 25 to 50° C.

Each the way is performed solely or concurrently with the other ways. After removing the aluminum oxide, a silicon powder can be obtained through a vacuum filtration method.

In this case, silicon having a porous shape like the conventional type of silica can be obtained.

The porous silica may be derived from diatomite. The diatomite is configured by precipitating single cell group called as diatom. The diatomite is composed of many porous materials whereby the main ingredient is silica.

The coating the porous silica onto the thin metal film may be coating a water-soluble polymer and the porous silica onto the thin metal film.

The water-soluble polymer can connect interface between the silica and the thin metal films. Accordingly, air traps occurring between the silica and the thin metal film are prevented, and the silica and the thin metal film can be effectively reacted with each other. Thus, an oxidation-reduction reaction can be increased, so finally the yield can be improved.

The water-soluble polymer may be polyethylene oxide, polyvinylpyrrolidone, polyacrylic acid, polyvinyl alcohol, polyethyleneimine, or a combination of thereof, but is not limited thereto.

The water-soluble polymer is removed by oxidation in the high temperature reaction. In addition, the water-soluble polymer is also removed in the filtration process because an acid is used for main solution in a process for removing the aluminum oxide.

A pattern may be formed on a surface of the thin metal film. A contact surface area between the silica and the thin metal film can be increased by a presence of the pattern. The reduction reaction rate of the silica can further be increased by increasing the surface area.

The shape of the pattern is not limited, but it may be in the stripe shape. Any pattern which can increase the surface area of the thin metal film is possible.

The pattern may be formed at intervals of 1 to 100 μm. When satisfied with the above range, the reduction reaction of the silica can effectively occur.

The method for forming the pattern may be performed by a typical etching method such as a wet etching method, a dry etching method, an optical etching method, and the like.

The thin metal film may be a thin aluminum film, a thin magnesium film, a thin calcium film, or a combination of thereof. However, it is not limited thereto if a metal is capable of performing an oxidation-reduction reaction occurring between the metal and the silica.

More specifically, described is the pattern of the thin metal film through drawings.

Figure 6:
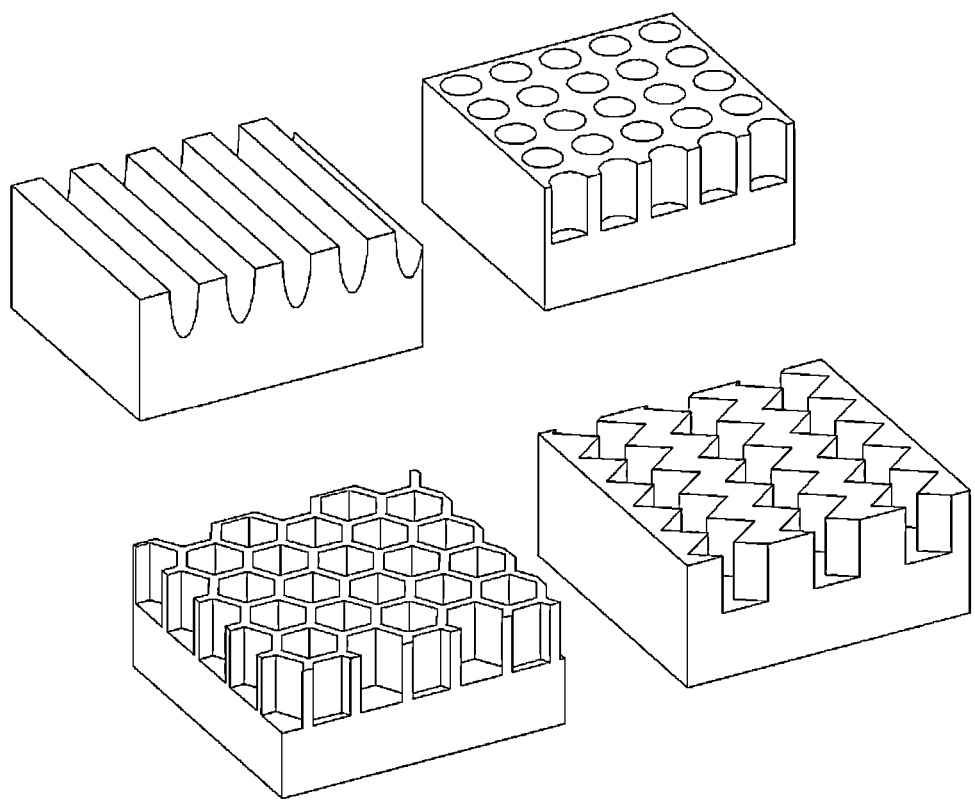
FIG. 6 is a 3D drawing illustrating a pattern formed on a surface of a thin metal film.

FIG. 6 is 3D drawing of the pattern formed on the surface of the thin metal film. An embodiment of the present invention is not limited to the pattern formation shown in FIG. 6. The pattern of FIG. 6 is just one example among various patterns.

Figure 7:
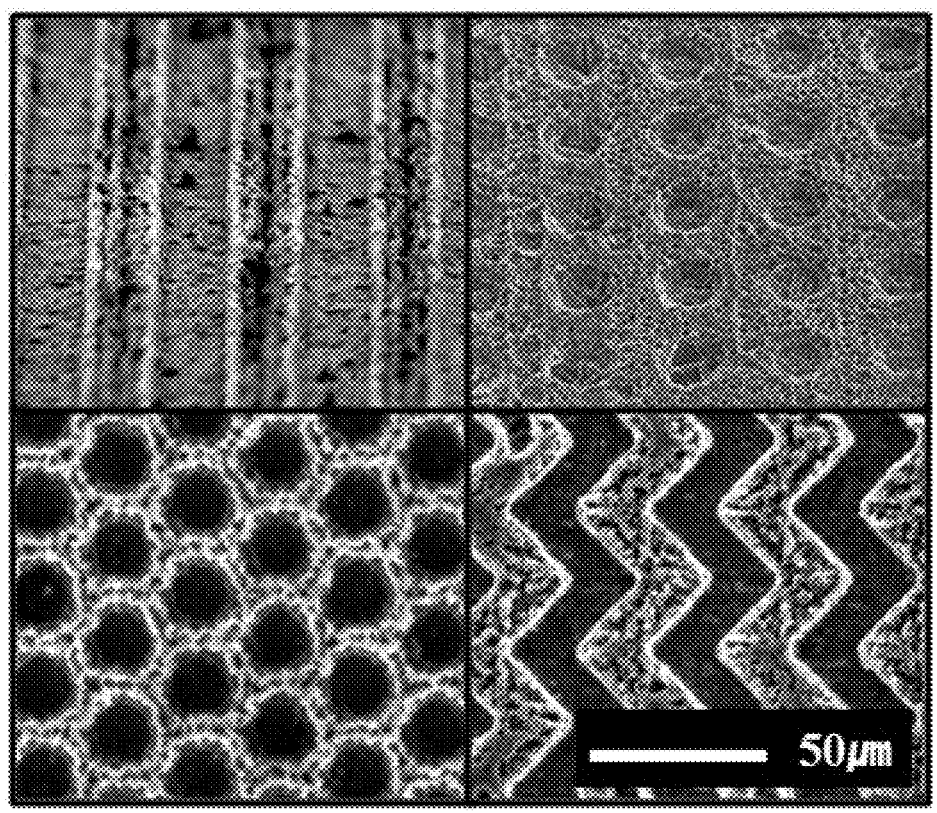
FIG. 7 is a SEM image of a surface of a thin metal film having a pattern formed on the surface.

In addition, FIG. 7 is SEM image of the surface of the thin metal film having a pattern formed on the surface. Various patterns shown in FIG. 7 can be formed.

The pattern can be adjusted depending on the thickness of the thin metal film, and the shape of the pattern may be the shape of honeycomb, regular hexagon, zigzag, equal intervals, hole, and the like. Further, the pattern depth may be about 5 to 20 μm, and the pattern interval may be 1 to 100 μm.

In the reducing the porous silica to a porous silicon by performing the heat-treatment of the thin metal film and the porous silica, the heat-treatment temperature may be 750 to 900° C.

However, the heat-treatment temperature may be adjusted depending on the thin metal film used in the process. For example, the heat-treatment may be performed at the temperature slightly above the metal melting temperature. In specific example, in the case of the thin aluminum film, the heat-treatment temperature may be 750 to 900° C. In the case of the thin magnesium film, the heat-treatment temperature may be 750 to 800° C.

The coating the porous silica onto the thin metal film may be performed by a roll-to-roll method.

In the coating the porous silica onto the thin metal film, there may be a plurality of units when supposing the thin metal film coated with the porous silica is one unit.

That is, the plurality of units may be performed the heat-treatment at the same time by configuring to include the plurality of units such as "thin metal film-silica-thin metal film-silica" as a continuous type through the roll-to-roll method.

In this case, the preparation efficiency of silicon finally obtained can be enhanced.

Figure 8:
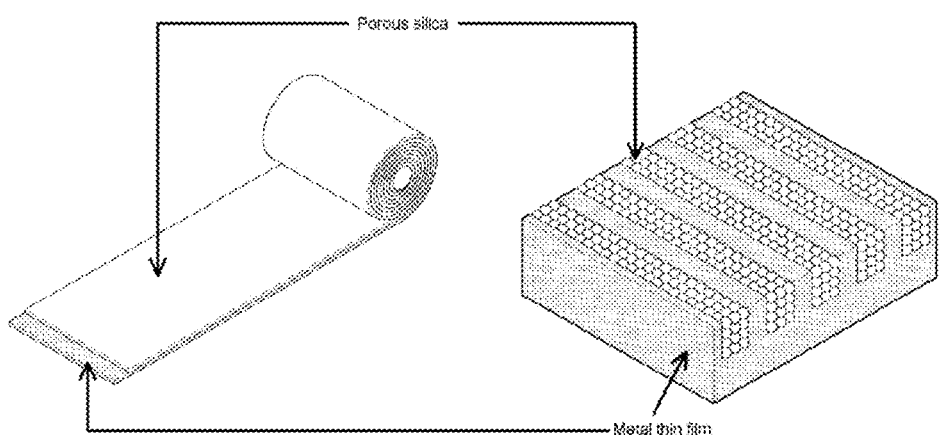
FIG. 8 is a schematic view regarding a method for coating porous silica on a thin metal film by a roll-to-roll method.

FIG. 8 is a schematic view regarding the method for coating porous silica on the thin metal film by the roll-to-roll method. FIG. 8 is an example among various coating methods in the present invention, an embodiment of the present invention is not limited thereto.

According to another embodiment of the present invention, provided is the negative electrode active material comprising the porous silicon according to the preparing method.

As described above, the negative electrode active material may comprise the porous silicon and other typical negative electrode active materials.

As mentioned above, the negative electrode of the lithium secondary battery comprises the current collector and the negative electrode active material layer formed on the current collector. The negative electrode active material layer comprises the negative electrode active material.

Since a description of the negative electrode active material is the same as previously stated above, the description thereof will be omitted.

The negative electrode active material layer includes a binder, and may further selectively include a conductive material.

The binder serves to attach the negative electrode active material particles to each other and the negative electrode active material to the current collector. The binder may be a water-insoluble binder, a water-soluble binder, or a combination thereof.

The water-insoluble binder may be polyvinylchloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide-imide, polyimide, or combinations thereof.

The water-soluble binder may be styrene-butadiene rubber, acrylated styrene-butadiene rubber, polyvinylalcohol, sodium polyacrylate, propylene, and olefin copolymers containing 2 to 8 carbon atoms, (meth) acrylic acid, (meth) acrylic acid alkyl ester copolymers or combinations thereof.

When the water-soluble binder is used as the negative electrode binder, the water-soluble binder may further include a cellulose-based compound which can impart the viscosity. Mixtures prepared by mixing one or more kinds of carboxymethyl cellulose, hydroxypropylmethyl cellulose, methyl cellulose, alkali metal salts thereof, and the like may be used as the cellulose-based compound. The alkali metal includes Na, K, or Li. Such the thickening agent content may be 0.1 to 3 parts by weight based on 100 parts by weight of the binder.

The conductive material is used to give conductivity to the electrode, and any material can be the conductive material as long as the material is an electronic conductive material and it does not trigger a chemical change in the battery configured according to the method. For example, the conductive material may include carbon-based materials such as natural graphite, artificial graphite, carbon black, acetylene black, ketjen black, carbon fiber, and the like; metal-based materials containing metal powders such as copper, nickel, aluminum, silver, and the like, metal fibers, and the like; conductive polymers such as polyphenylene derivatives; and a mixture thereof.

The current collector include a copper foil, a nickel foil, a stainless steel foil, a titanium foil, a nickel foam, a copper foam, a polymer substrate coated with conductive metals, and groups consisting of combinations thereof.

The positive electrode includes the current collector and the positive electrode active material layer formed on the current collector. The positive electrode active material may include compounds capable of reversibly intercalating and deintercalating lithium ions (lithiated intercalation compounds). Specifically, one or more composite oxides between lithium and metals selected from cobalt, manganese, nickel, and combinations thereof may be used. For specific example, compounds represented by one of the following general formula may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α<2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α<2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMnG_bPO_4$ (0.90≤a≤1.8, 0.001≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$

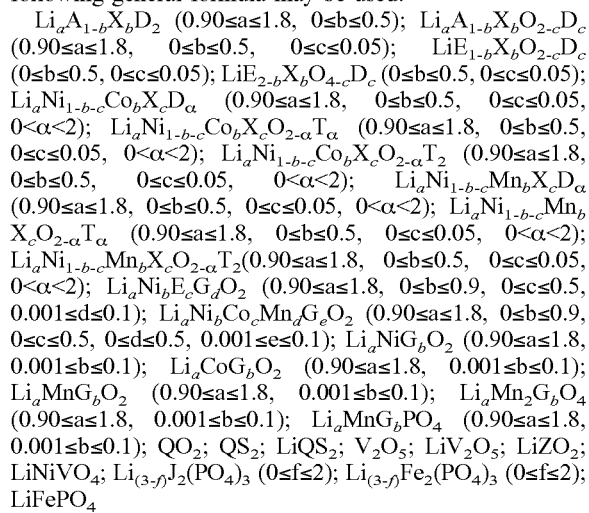

In the above formula, A is selected from Ni, Co, Mn, and the group consisting of combinations thereof; X is selected from Al, Ni, Co, Mn, Cr, Fe, Mg, Sr, V, rare earth elements and the group consisting of combinations thereof; D is selected from O, F, S, P, and the group consisting of combinations thereof; E is selected from Co, Mn, and the group consisting of combinations thereof; T is selected from F, S, P, and the group consisting of combinations thereof; G is selected from Al, Cr, Mn, Fe, Mg, La, Ce, Sr, V, and the group consisting of combinations thereof; Q is Ti, Mo, Mn, and the group consisting of combinations thereof; Z is selected from Cr, V, Fe, Sc, Y, and the group consisting of combinations thereof; J is selected from V, Cr, Mn, Co, Ni, Cu, and the group consisting of combinations thereof.

Of course, a compound having a coating layer on the surface may be used, and a mixture between the compound and the compound having the coating layer also may be used by mixing each other. The coating layer may include at least one coating element compound selected from the group consisting of oxides of the coating element, hydroxides, oxy-hydroxides of the coating element, oxy-carbonate of the coating element, and hydroxyl carbonate of the coating element. Compounds constituting the coating layers may be amorphous or crystalline. The coating element included in the coating layer may include Mg, Al, Co, K, Na, Ca, Si, Ti, V, Sn, Ge, Ga, B, As, Zr, or combinations thereof. A coating layer formation step may be done by using any coating method as soon as the method does not adversely affect the physical properties of the positive electrode active material by using these elements in the compound such as a spray coating, a dipping method, or the like. The method as described above is well-known to those who work in this field, so a detailed description thereof will be omitted.

The positive electrode active material layer also includes a binder and a conductive material.

The binder not only attaches the positive electrode active material particles to each other but also adheres the positive electrode active material to the current collector. For typical example, there may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but is not limited thereto.

The conductive material is used to give conductivity to the electrode, and any material can be the conductive material as long as the material is an electronic conductive material and it does not trigger a chemical change in the battery configured according to the method. For example, a conductive material may include metal powders such as natural graphite, artificial graphite, carbon black, acetylene black, ketjen black, carbon fiber, copper, nickel, aluminum, silver, or the like; metal fibers; and the like. Moreover, a mixture of one or more conductive materials such as polyphenylene derivatives or the like may be used.

The current collector may include Al, but the embodiment is not limited thereto.

The negative electrode and the positive electrode prepare the active material composition by mixing the active material, a conductive agent, and a binder in a solvent, and by coating the composition onto a current collector. This electrode preparing method is well known in the art, thus a detailed description thereof will be omitted in the present specification. N-methylpyrrolidone and the like may be used as the solvent, but the embodiment is not limited thereto.

A non-aqueous electrolyte secondary battery according to an embodiment of the present invention, the non-aqueous electrolyte includes a non-aqueous solvent and a lithium salt.

The non-aqueous organic solvent serves as a medium thereby ions are involved in the electrochemical reaction of the battery.

The separator may be present between the positive electrode and the negative electrode depending on the type of the lithium secondary battery. Polyethylene, polypropylene, polyvinylidene fluoride, or a multi-layered film with two or more layers thereof may be used for the separator. In addition, a mixed multi-layered film such as a polyethylene/polypropylene two-layer separator, a polyethylene/polypropylene/polyethylene three-layer separator, and a polypropylene/polyethylene/polypropylene three-layer separator, and the like may be used too.

In FIG. 1, a typical structure of a lithium secondary battery of the present invention is schematically shown. As shown in FIG. 1, the lithium secondary battery (1) comprises: a positive electrode (3); a negative electrode (2); a battery container (5) including an electrolyte impregnated with a separator (4) existing between the positive electrode (3) and the negative electrode (2); and a seal member (6) which encloses the battery container (5).

Hereinafter, embodiments and comparative examples of the present invention are described. However, embodiment stated below is just an embodiment of the present invention, so the present invention is not limited thereto.

EXAMPLE

Example 1: Preparation of Porous Silicon Negative Electrode Active Material

A thin film and silica was coated by roll-to-roll method and then a heat-treatment reaction was performed in a tubular reactor in order that the weight ratio of the porous silica and the thin metal film is 3:1.8 (g). At this time, the thickness of the silica film coated onto the thin film can be possible from over hundred micrometers (am) to millimeters (mm).

At this time, patterns can be formed on the surface of the thin film at intervals of 1 to 100 μm. The depth of the formed pattern may be 1 to tens μm.

The reaction was performed within the range of 700 to 950° C. for 3 to 12 hours, and the aluminum oxide and the porous silicon were mixed after the reaction.

The aluminum oxide formed after the heat-treatment can be removed by the method described above.

After removal of the aluminum oxide, a silicon powder can be obtained through the vacuum filtration method.

After the powder was obtained, the powder can be used as a negative electrode material by finally drying the powder through a vacuum oven.

The water-soluble polymer was removed during a high temperature reaction. The residual polymer generated during the removal of the aluminum oxide process because an acid was used as the main solution was removed too.

Comparative Example 1: Preparation of a Typical Si-Based Negative Active Material Normally, the Si powder is purchased from various companies and used, but the present comparative example, the silicon powder purchased from Aldrich (wherein it is 325 mesh, and its average particle size is 40 micrometers) was used.

Example 2: Preparation of a Coin Cell

A coin-type (2016 R-Type) cells was prepared by using the synthesized silicon negative electrode material in Example 1 and a thin lithium metal film as a positive electrode.

The coin cell battery was prepared by incorporating the electrodes through the separator made from polyethylene thereby the thickness of the separator was 20 μm, by compressing them, and by injecting the electrolyte thereto. At this time, a LiPF6 dissolved in a mixed solvent of ethylene carbonate (EC), ethyl methyl carbonate (EMC), and diethyl carbonate (DEC) (wherein the volume ratio of EC:EMC:DEC is 3:4:3) with 1M concentration was used as an electrolyte.

Comparative Example 2: Preparation of a Coin Cell

A coin-type (2016 R-Type) cell was prepared by using the silicon powder purchased in Comparative Example 1 as the negative electrode material and a thin lithium metal film as the positive electrode.

The coin cell battery was prepared by incorporating the electrodes through the separator made from polyethylene, thereby the thickness of the separator was 20 μm, by compressing them, and by injecting the electrolyte thereto. At this time, a LiPF6 dissolved in a mixed solvent of ethylene carbonate (EC), ethyl methyl carbonate (EMC), and diethyl carbonate (DEC) (wherein the volume ratio of EC:EMC:DEC is 3:4:3) with 1M concentration was used as an electrolyte.

Experimental Example

Experimental Example 1: SEM Photo

Figure 2:
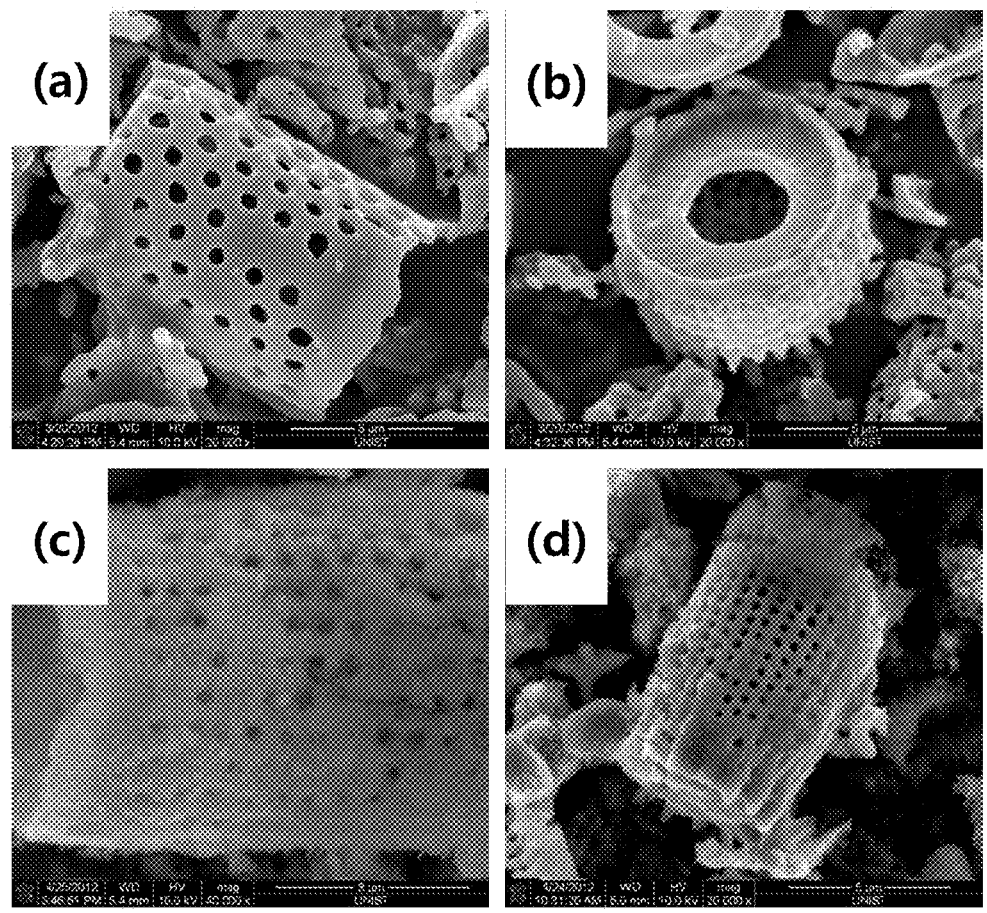
FIG. 2 is a SEM image of porous silica and porous silicon according to Example 1.

FIG. 2 is a SEM image of porous silica and porous silicon according to Example 1.

More specifically, FIGS. 2(a) and (b) are SEM images of the porous silica, and FIGS. 2(c) and (d) are SEM images of the porous silicon.

As in FIG. 2, porous structures is being maintained within the preparing the negative electrode material from raw materials.

Experimental Example 2: XRD Measurements

Figure 3:
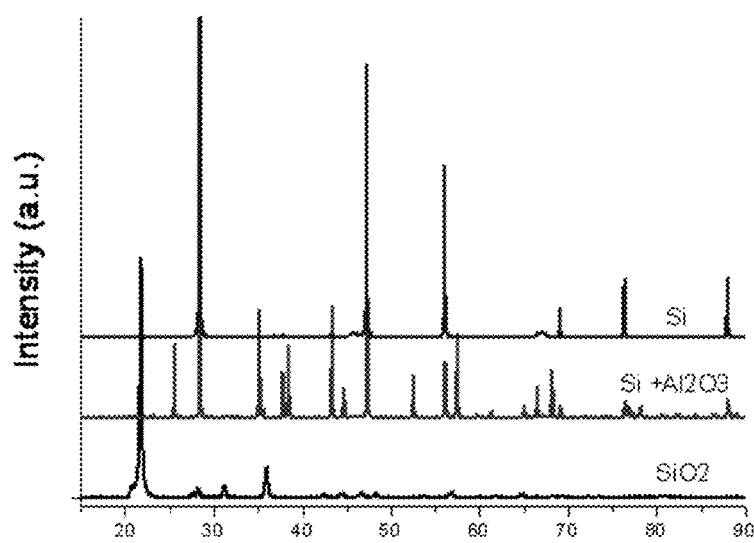
FIG. 3 is XRD data for each step according to Example 1.

FIG. 3 is XRD data for each step according to Example 1.

XRD was measured at 2500V by using the Rigaku D/MAX and CuKα as a light source.

For reference, the X-axis in FIG. 3 is not the meaning of the unit because the X-axis is an arbitrary scale. The relative position of the peak can take a meaning.

Shown is that the silica in the Example 1 was reduced to the silicon.

Experiment 3: Comparison of the Coin Cell

Figure 4:
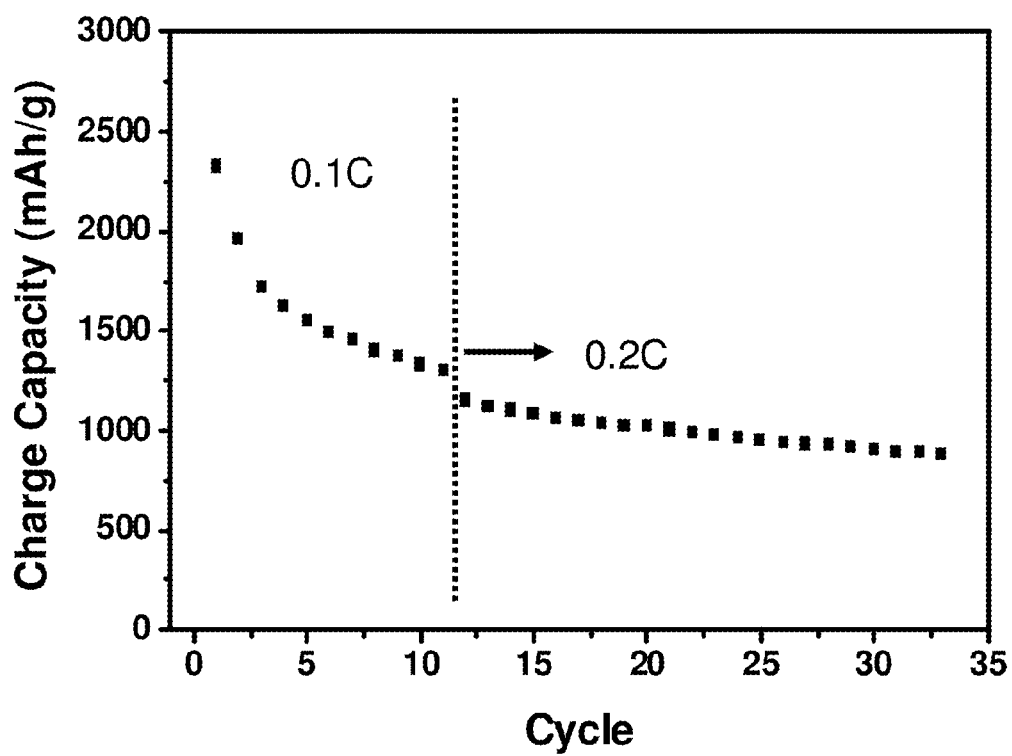
FIG. 4 is a graph illustrating the cycle characteristics of coin cells according to Example 2.
Figure 5:
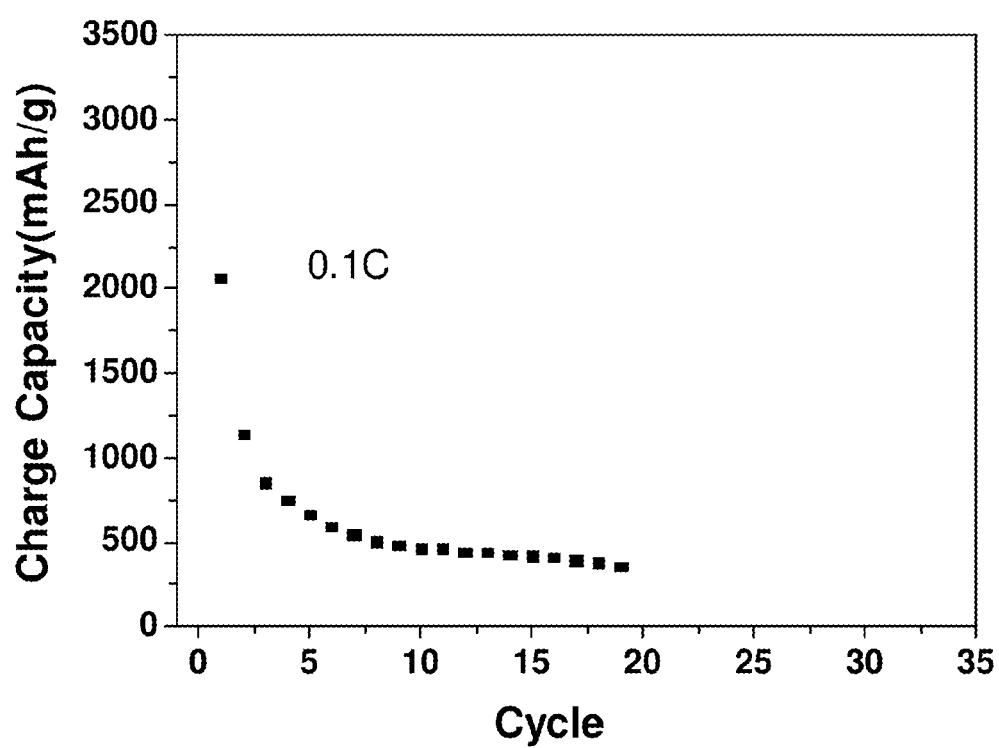
FIG. 5 is a graph illustrating the cycle characteristics of coin cells according to Comparative Example 2.

FIG. 4 is a graph illustrating the cycle characteristics of coin cells according to Example 2, and FIG. 5 is a graph illustrating the cycle characteristics of coin cells according to Comparative Example 2.

As shown in Comparative Example 2, in the case of silicon powder, the capacity drops to 500 mAh/g at 0.1 C rate after 5 cycles.

In contrast, in Example 2, the capacity of 1,300 mAh/g is realized at 0.1 C rate, and the reversible capacity of about 1,000 mAh/g or more can be realized at 0.2 C rate.

The present invention is not limited to the embodiments, and may be prepared in different forms. Those skilled in the art of the present invention can understand that it can be embodied in other specific forms without departing from its spirit or essential characteristics. Therefore, the described embodiments are to be considered just as illustrative and not restrictive in all respects.

The invention claimed is:

1. A method for preparing a silicon-based negative electrode active material, comprising:
preparing a porous silica ($SiO_2$) and a thin metal film;
coating the porous silica onto the thin metal film;
reducing the porous silica to a porous silicon by performing heat-treatment of the thin metal film and the porous silica; and
obtaining the porous silicon.

2. The method of claim 1, wherein
the porous silica is derived from diatomite.

3. The method of claim 1, wherein
the coating the porous silica onto the thin metal film is
coating a water-soluble polymer and the porous silica onto the thin metal film.

4. The method of claim 3, wherein
the water-soluble polymer is polyethylene oxide, polyvinylpyrrolidone, polyacrylic acid, polyvinyl alcohol, polyethyleneimine, or a combination of thereof.

5. The method of claim 3, wherein
the coating a water-soluble polymer and the porous silica onto the thin metal film is
coating the water-soluble polymer onto the interface between the thin metal film and the porous silica.

6. The method of claim 1, wherein
the thin metal film is a thin aluminum film, a thin magnesium film, a thin calcium film, or a combination of thereof.

7. The method of claim 1, wherein
a pattern is formed on a surface of the thin metal film.

8. The method of claim 7, wherein
the pattern is formed at intervals of 1 to 100 μm.

9. The method of claim 1, wherein
the coating the porous silica onto the thin metal film is performed by a roll-to-roll method.

10. The method of claim 1, wherein
in the coating the porous silica onto the thin metal film,
there are a plurality of units when supposing a thin metal film coated with the porous silica is one unit.

11. The method of claim 1, wherein
in the reducing the porous silica to a porous silicon by performing heat-treatment of the thin metal film and the porous silica,
the heat-treatment temperature is 750 to 900° C.

12. A negative electrode active material for a lithium secondary battery, comprising the porous silicon obtained according to claim 1.

13. A lithium secondary battery comprising:
a negative electrode including the negative electrode active material for a lithium secondary battery according to claim 12;
a positive electrode including a positive electrode active material; and
an electrolyte.

14. The lithium secondary battery of claim 13, wherein
the lithium secondary battery further comprises a separator between the positive electrode and the negative electrode.

* * * * *